G. E. KERNS.
MAIL HANDLING APPARATUS.
APPLICATION FILED FEB. 24, 1915.
1,161,869.
Patented Nov. 30, 1915.
9 SHEETS—SHEET 1.
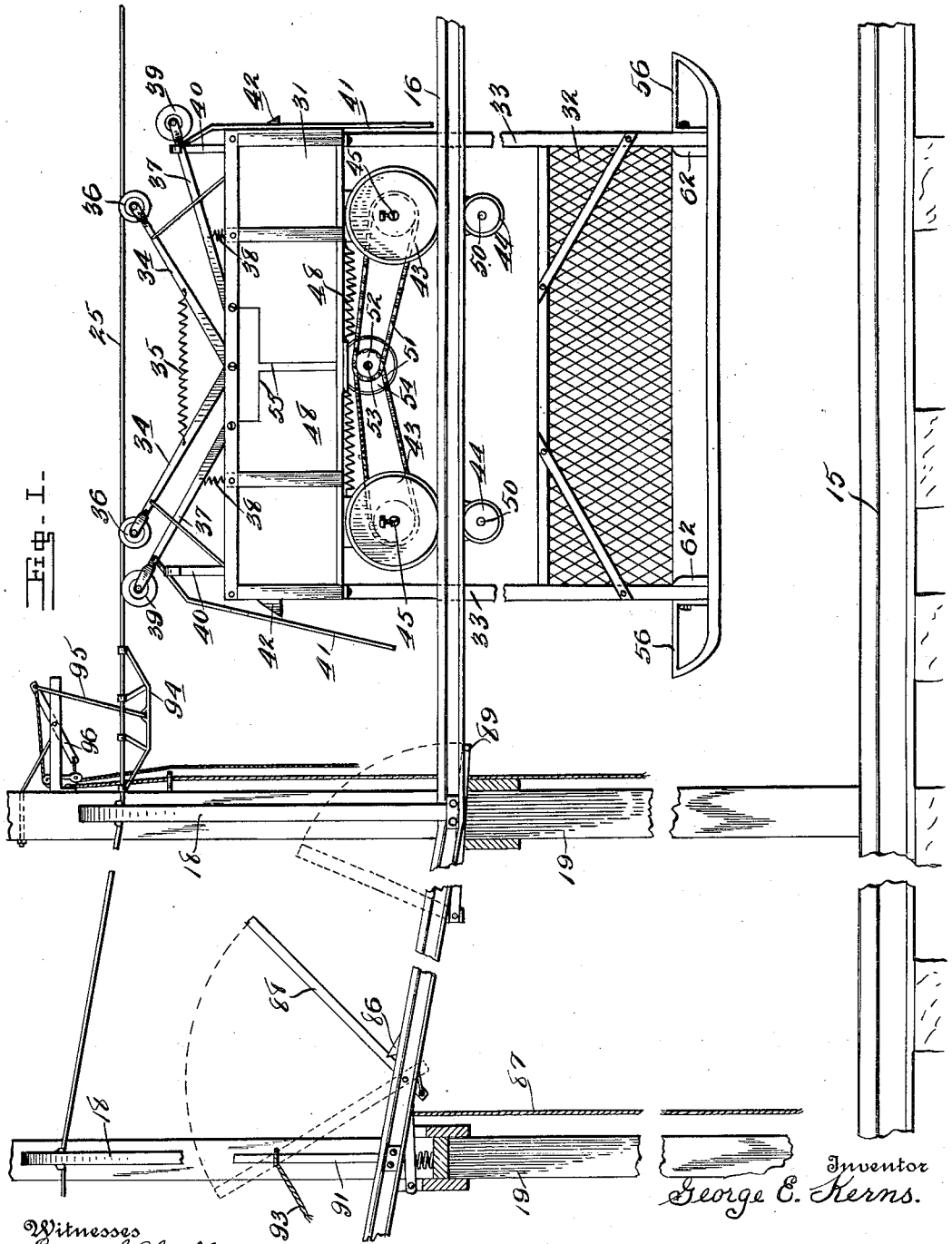
Witnesses
Edw. S. Hall.
Ross J. Woodward.
Inventor
George E. Kerns.
By Richard B. Owen
Attorney

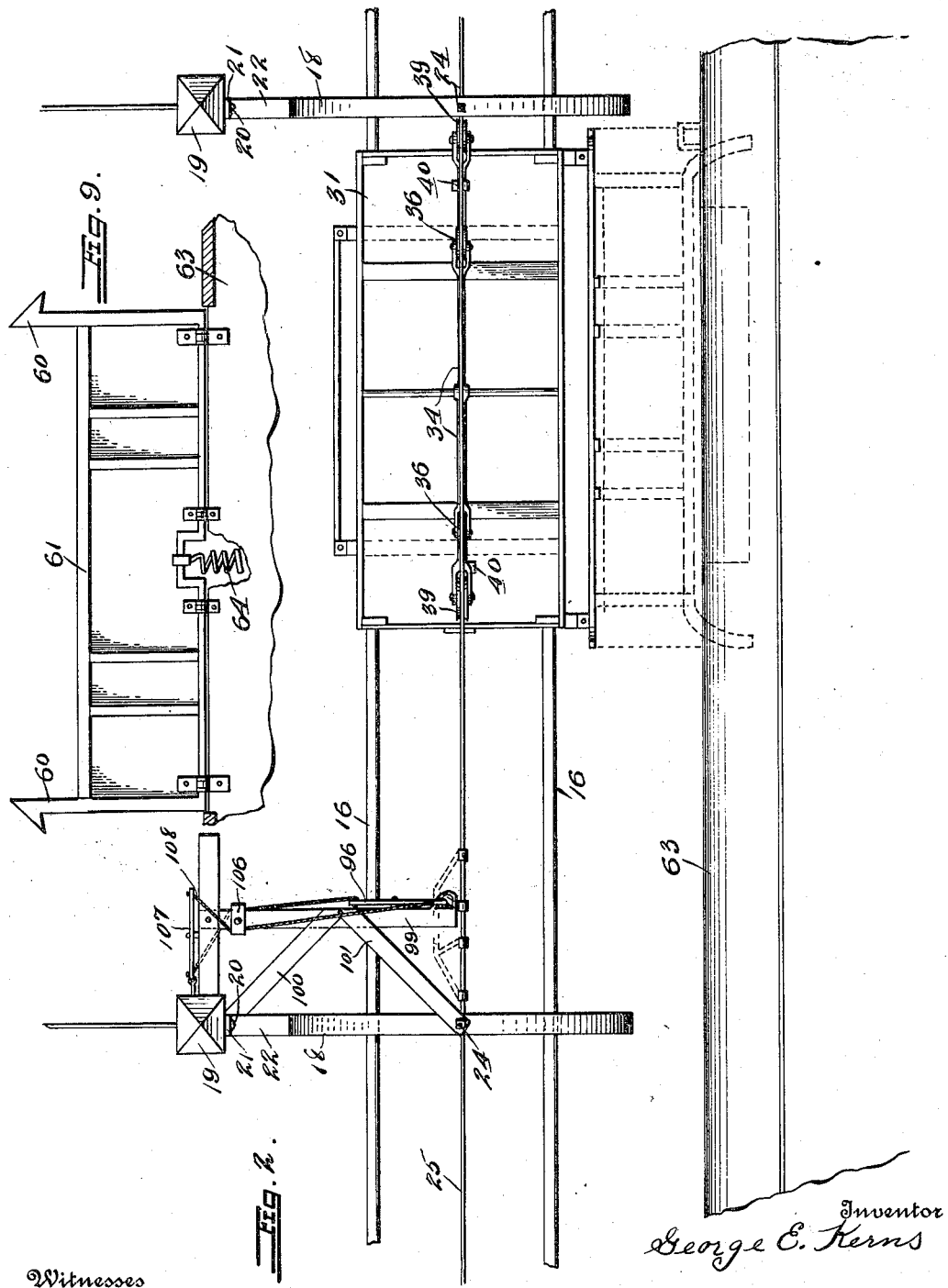

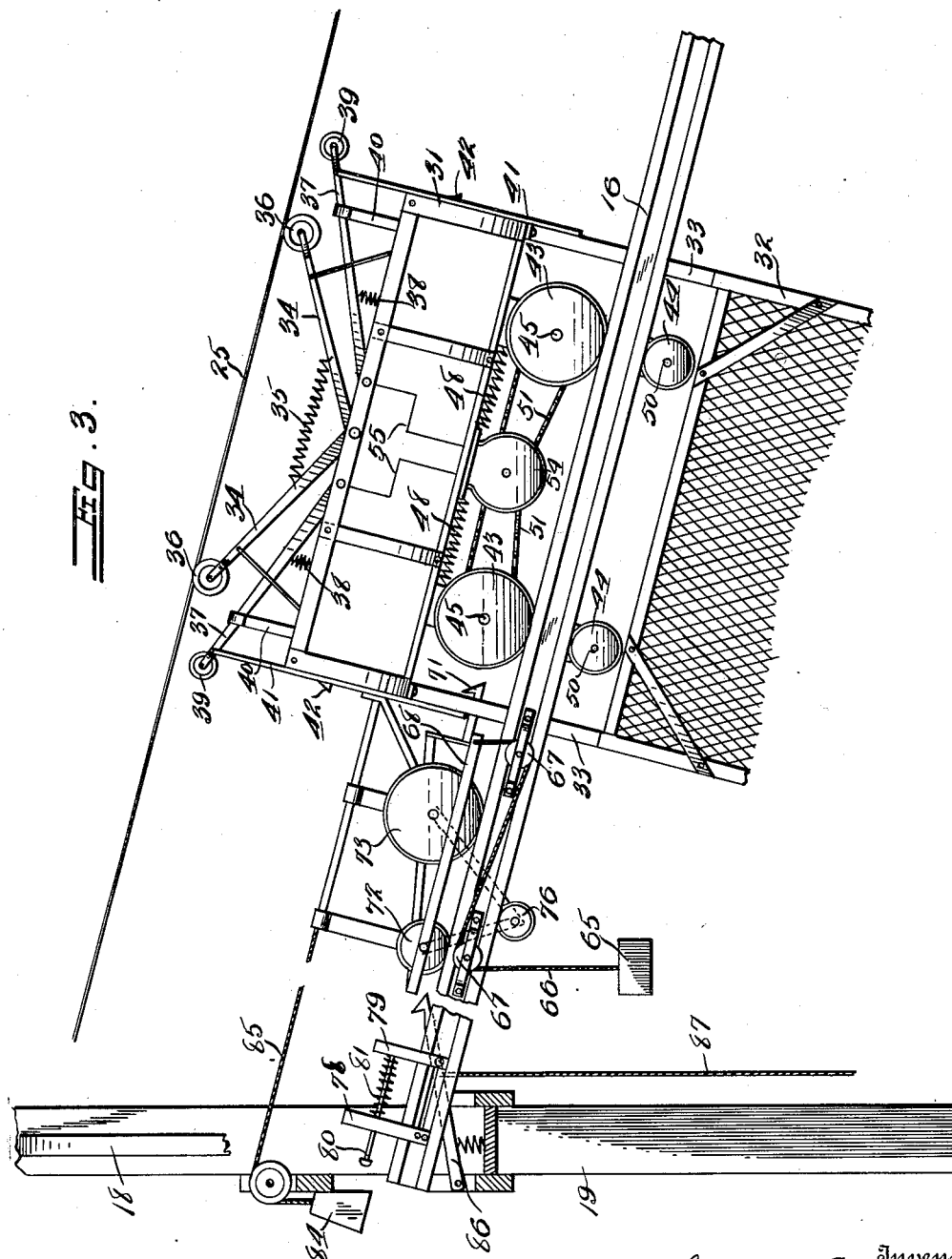

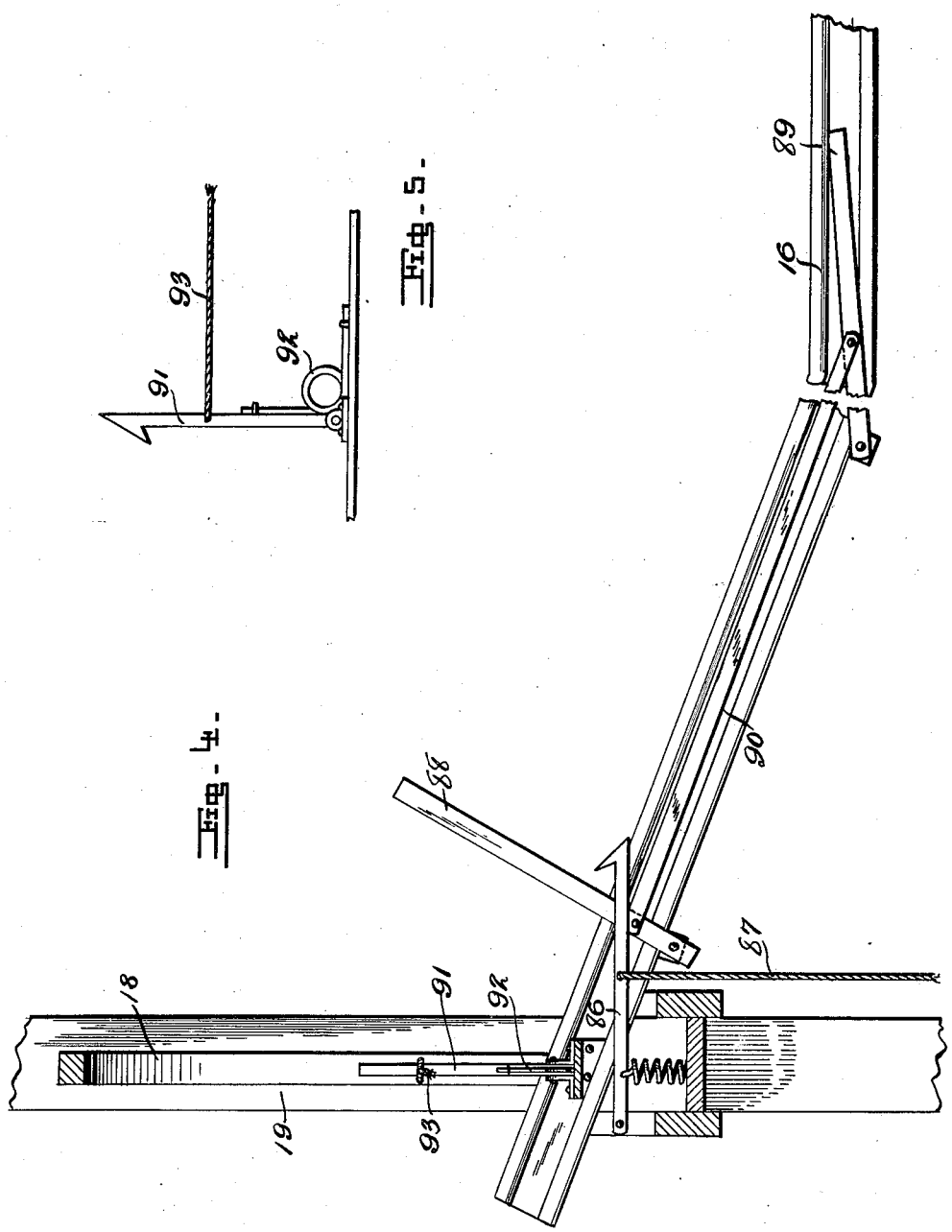

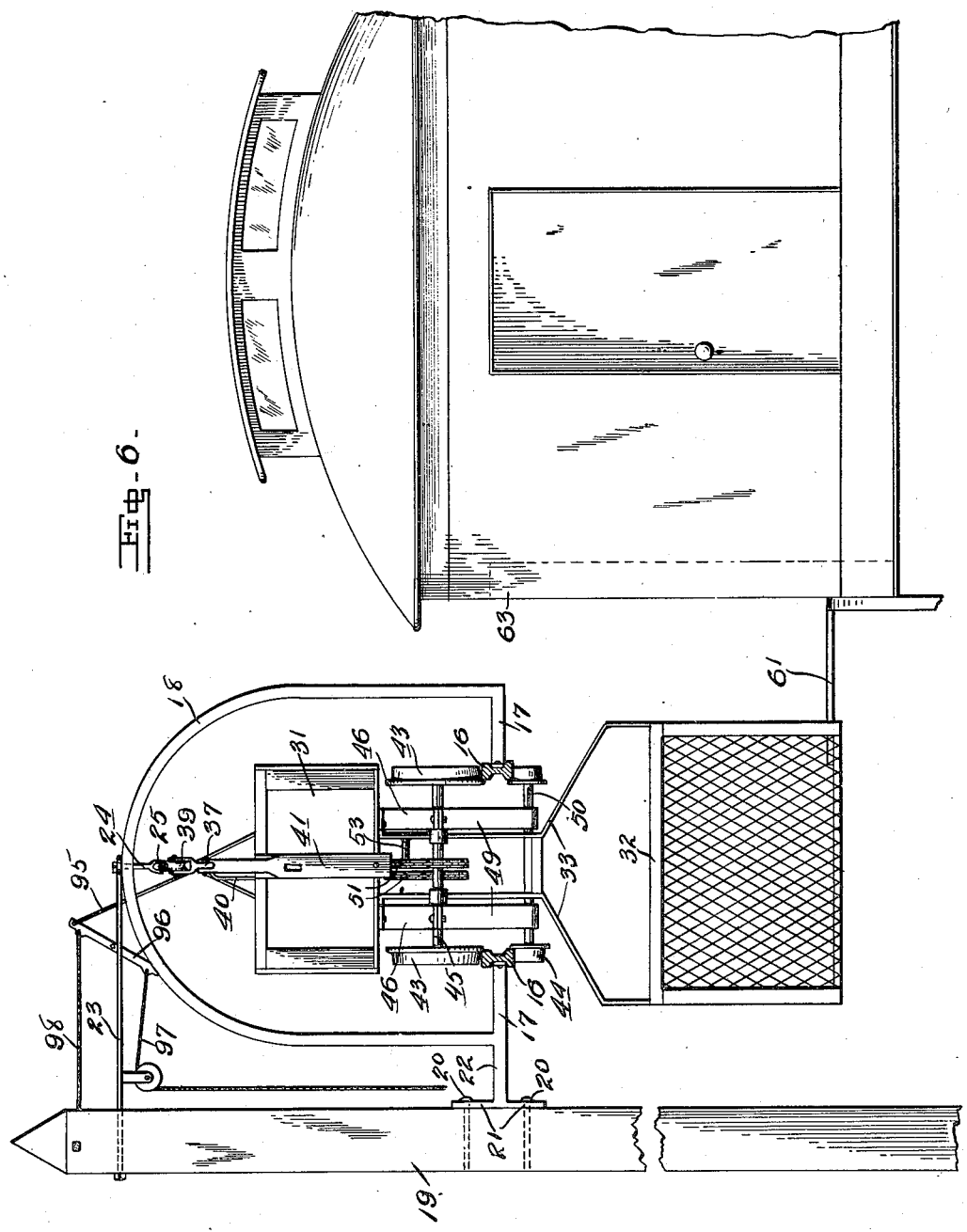

G. E. KERNS.
MAIL HANDLING APPARATUS.
APPLICATION FILED FEB. 24, 1915.
1,161,869.
Patented Nov. 30, 1915.
9 SHEETS—SHEET 6.
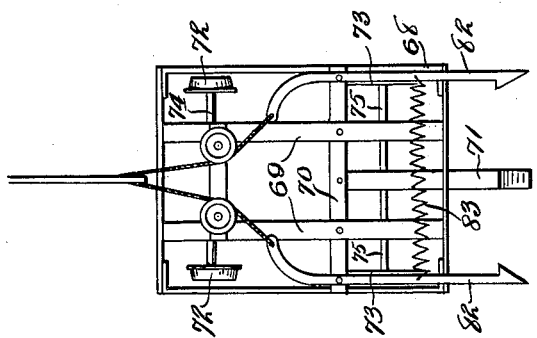
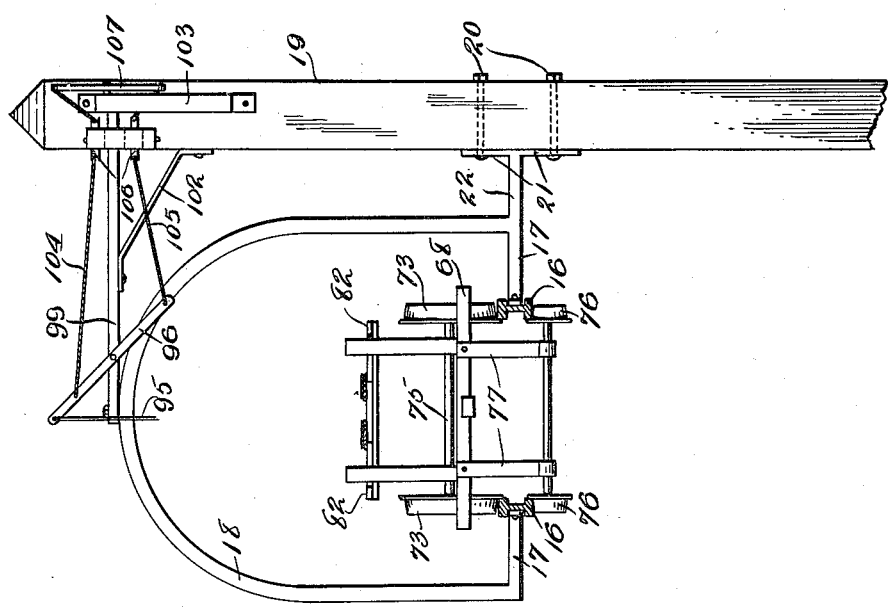
Witnesses
Edw. S. Hall.
Ross J. Woodward,
Inventor
George E. Kerns.
By Richard B. Owen,
Attorney

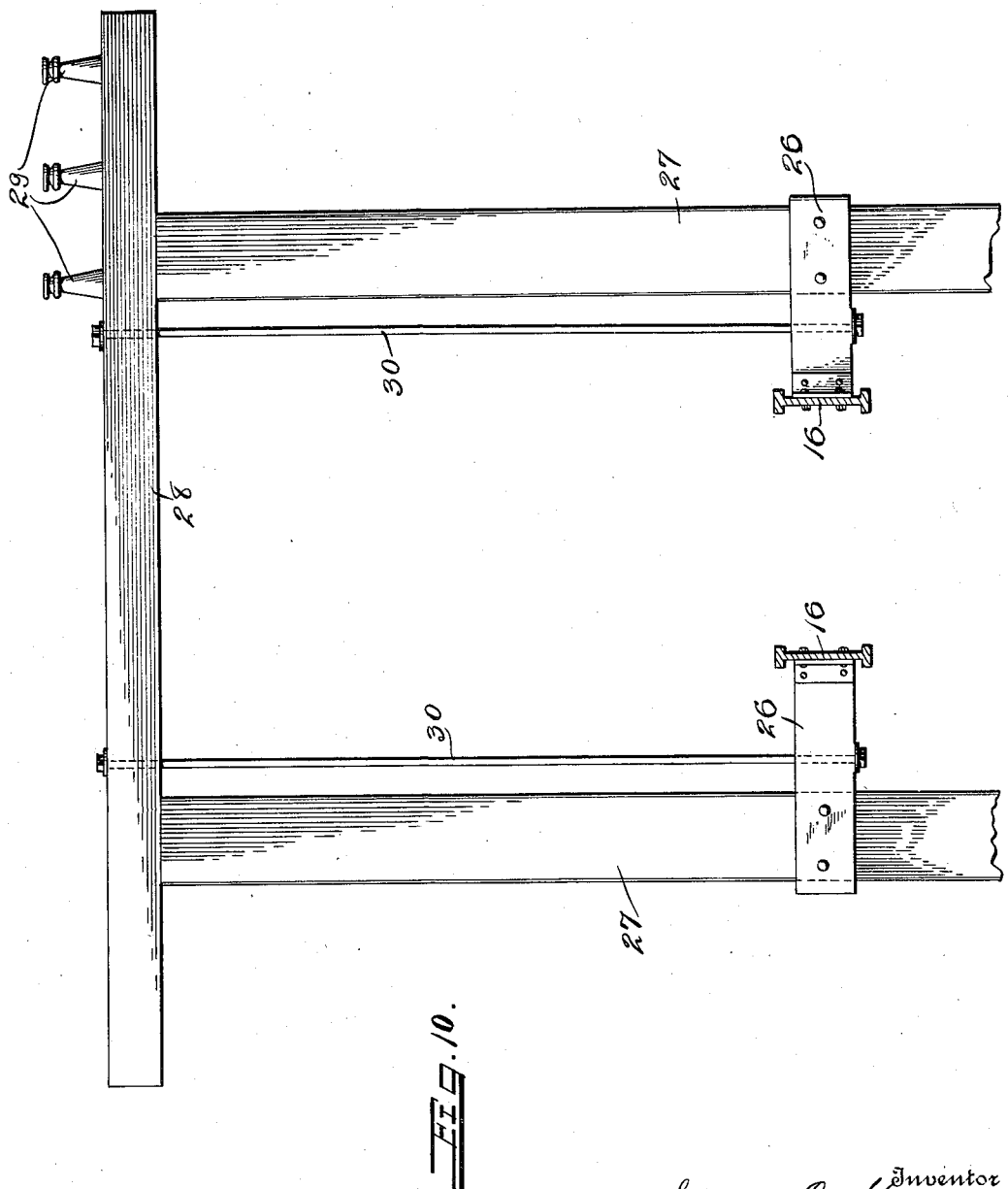

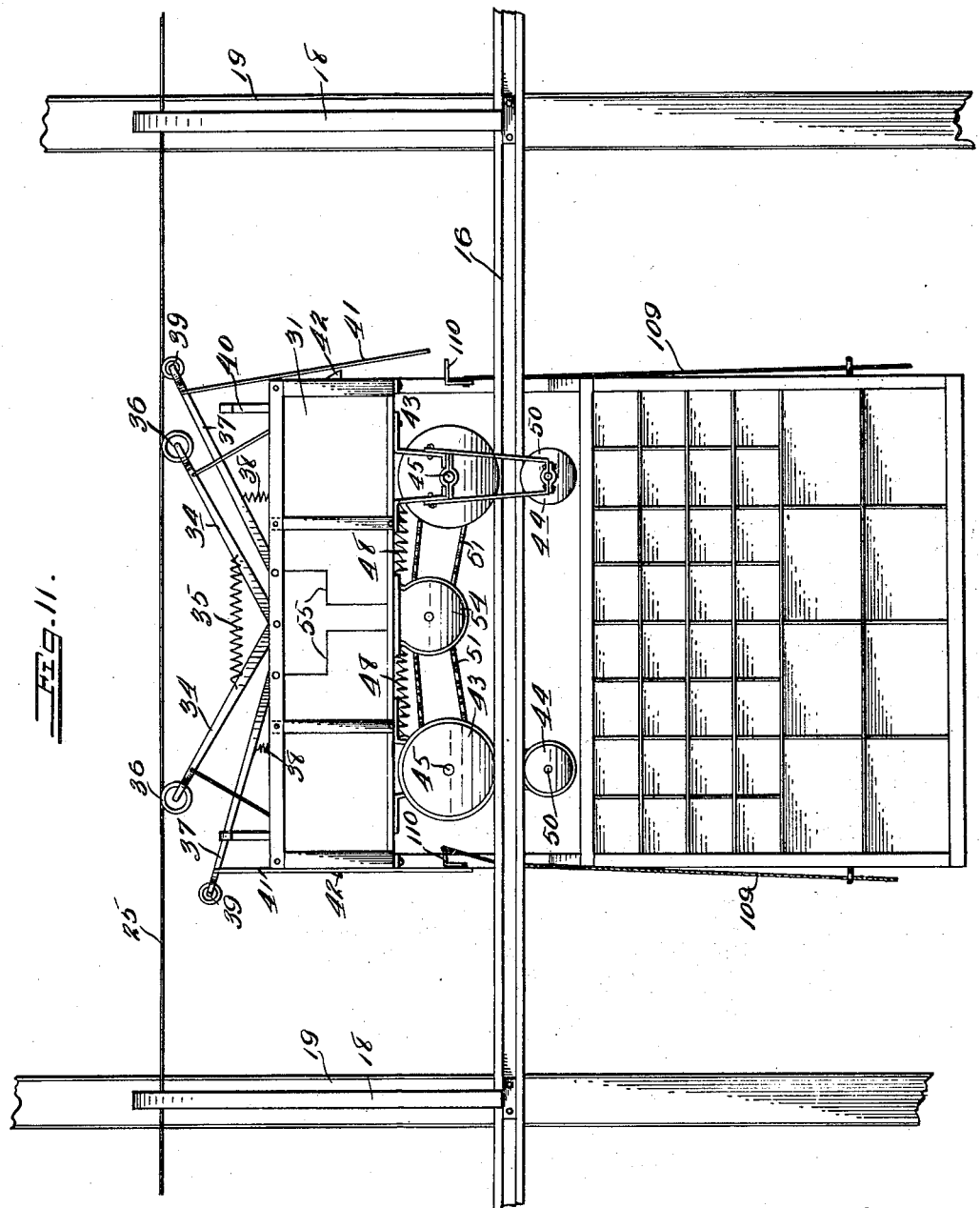

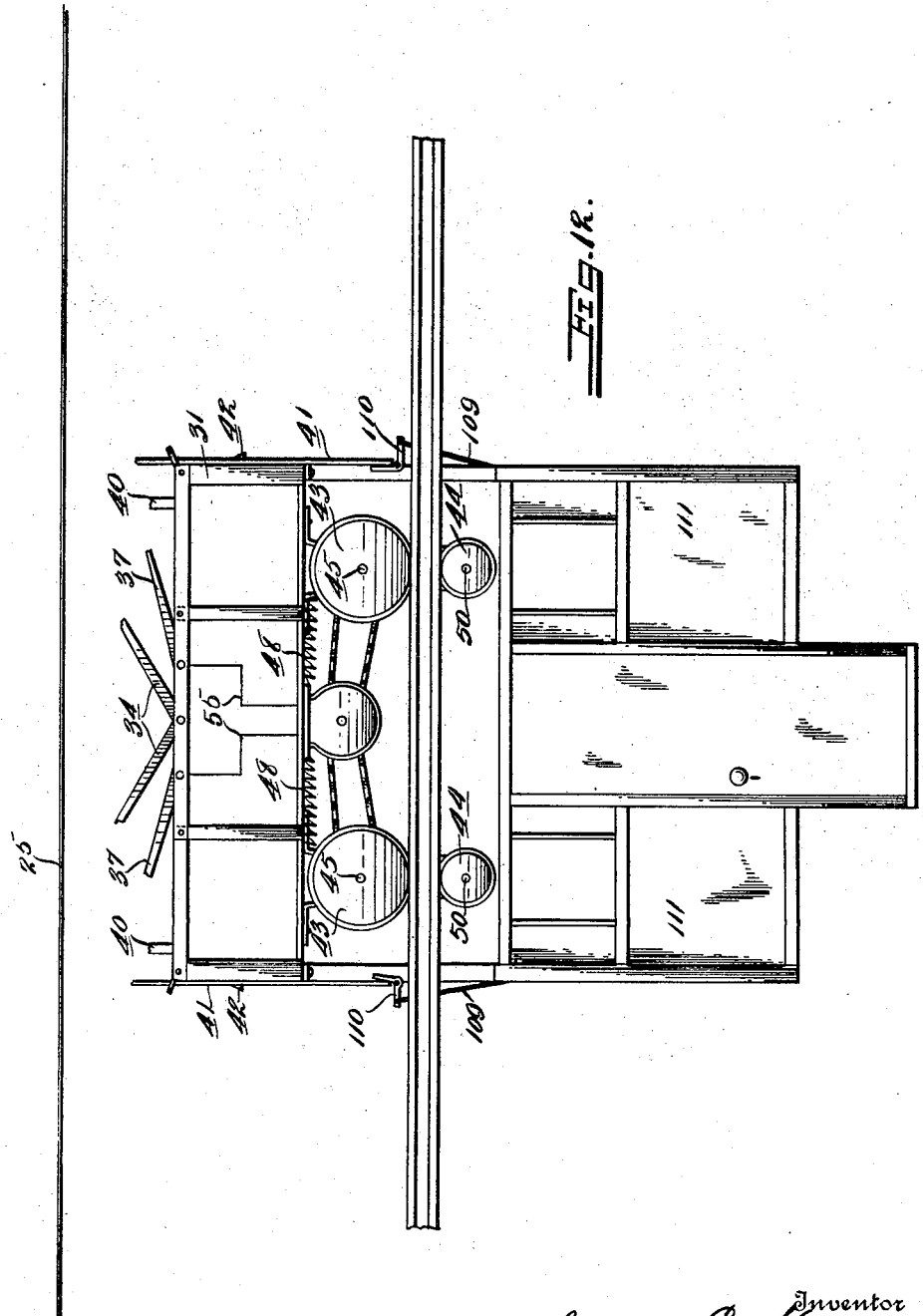

UNITED STATES PATENT OFFICE.

GEORGE E. KERNS, OF ARCHER CITY, TEXAS.

MAIL-HANDLING APPARATUS.

1,161,869. Specification of Letters Patent. Patented Nov. 30, 1915.

Application filed February 24, 1915. Serial No. 10,300.

*To all whom it may concern:*

Be it known that I, GEORGE E. KERNS, a citizen of the United States, residing at Archer City, in the county of Archer and State of Texas, have invented certain new and useful Improvements in Mail-Handling Apparatus, of which the following is a specification.

This invention relates to an improved mail handling apparatus and the principal object of the invention is to provide an improved mail handling device of the auxiliary car type in which the auxiliary car may be carried along with the mail car of the train and the auxiliary car then automatically detached from the mail car upon reaching the end of its track, the auxiliary car being then returned to its original position at the opposite end of its track after the mail has been transferred to the receptacle.

Another object of the invention is to provide an improved type of auxiliary car which is so constructed that it will be securely mounted upon its track and prevented from accidentally slipping off.

Another object of the invention is to provide improved trip means for the trolley poles of the auxiliary car so that when the car reaches one end of its track certain of the trolley poles may be moved to inoperative positions.

Another object of the invention is to provide improved means for releasably holding the auxiliary car at one end of its track and means for releasing the car so that it may travel to the opposite end of the track.

Another object of the invention is to provide improved bumper means for checking the speed of the auxiliary car as it approaches the end of its track.

Another object of the invention is to provide improved actuating means for the trip mechanism.

Another object of the invention is to provide an improved type of bridge connecting the auxiliary car with the mail car of the train while transferring mail from the mail car to the auxiliary car or from the auxiliary car to the mail car.

Another object of the invention is to so construct this auxiliary car that the mail matter may be very easily transferred within a short space of time.

This invention is illustrated in the accompanying drawings, wherein:—Figure 1 is a view in elevation showing the auxiliary car adjacent one end of its track. Fig. 2 is a view showing the auxiliary car, its track and a portion of a mail car in top plan. Fig. 3 is a view similar to Fig. 1 showing the auxiliary car releasably held at one end of its track. Fig. 4 is a fragmentary view in elevation of one end portion of the track structure shown in Fig. 1. Fig. 5 is a view in elevation of the hook used for holding the pivoted bars of Figs. 1 and 4 in a raised position. Fig. 6 is a view showing the mail car and auxiliary car together with its supporting post and track in end elevation, the rails of the auxiliary car being shown in section. Fig. 7 is a view of the post and track structure of Fig. 6, the same being shown in elevation similar to the showing in Fig. 6 but looking in the opposite direction. Fig. 8 is a plan view of the frame or carriage of the bumper shown in Fig. 3. Fig. 9 is a view in plan of the bridge which is connected with the railway mail car. Fig. 10 is a view principally in elevation showing a modified form of track for the auxiliary car. Fig. 11 is a view in elevation of a modified type of auxiliary car. Fig. 12 is a view similar to Fig. 11 showing still another modification in the construction of the auxiliary car.

This mail handling apparatus is mounted adjacent the railroad track 15 and includes rails 16 which may be secured to the arms 17 of the arches 18 which arches are secured to the post 19 by the bolts 20 which pass through the seat 21 extending from the legs 22 of the arches. These arches may have their upper end portions braced by the rods 23 which rods are connected with the arches by the eye bolts 24 carrying the trolley wire 25 or they may be braced by means which will hereinafter be described. If desired the rails may be carried throughout the length of the track by arches or if desired the section of the rails between the end portions of the track may be carried by clamps 26 which clamps are secured to the posts 27 positioned upon opposite sides of the auxiliary track. These posts 27 have their upper ends connected with a bridge or cross beam 28 which bridge may carry the insulators 29 for telegraph or telephone wires and may also carry supporting rods 30 for the clamps 26. This modified track supporting structure is illustrated in Fig. 10 of the drawings.

The auxiliary car or mail receptacle comprises a motor car indicated in general by the numeral 31 and a basket 32 which is suspended beneath the motor by means of the suspending arms 33. The body portion of the motor car carries the pivotally mounted guiding arms 34 which are normally held in the raised position by the spring 35 so that the wheels 36 will engage the trolley wire 25. The trolley poles 37 are also pivotally connected with the body portion of the motor and are normally held in a raised position by the spring 38 so that the trolley wheels 39 may engage the trolley wire. It is only desired to have one of these trolley wheels engage the wire at a time and therefore hooks 40 have been provided so that when the trolley poles are moved downwardly by the trip mechanism to be hereinafter described the trolley poles will be engaged by the hook and releasably held in a lowered position. There has also been provided latches 41 which are carried by the trolley poles 37 adjacent the harp for the trolley wheels 39, the latches being provided with openings so that the teeth 42 may pass into the openings. These latches will therefore hold the trolley poles in a lowered position until the latches have been released by mechanism which will be hereinafter described.

It is necessary that the auxiliary car be held upon its track and prevented from all danger of jumping the same and therefore there has been provided main wheels 43 and auxiliary wheels 44, the main wheels resting upon the tread portions of the rails 16 and the auxiliary wheels engaging the lower faces of the rails. The axles 45 for the main wheels are mounted in the hanger bearing brackets 46 which are secured to the plates 47 pivotally mounted beneath the body portion of the motor and yieldably held in a normal position by the spring 48 therefore the trucks of the auxiliary cars can follow the curvature of a track and then return to their normal position. These hanger bearing brackets 46 carry hanger brackets 49 for the axles 50 of the auxiliary wheels 44, the axles 50 being loosely mounted in the bearings 49 so that they may turn with the wheels or if desired, being rigidly mounted in the bearings with the wheels rotatably mounted upon the axles. It is of course obvious that the wheels 43 must be rigidly mounted upon the axles 45 so that when the axles 45 are rotated by the sprocket chains 51 the wheels 43 will rotate with the axles. These sprocket chains 51 pass around the sprocket wheels mounted upon the axles 45 and also pass around the sprocket wheels 52 of the driving shaft 53 of motor 54 which motor receives its current from the poles 37 by means of the wires 55.

The receptacle 32 is provided upon one side with the hooks 56 intended to engage the hooks 60 of bridge 61. These members 56 therefore will form cam elements so that when the bridge is lowered the hooks 60 will engage the strips 62 and releasably connect the mail catcher with the mail car 63. This bridge 61 is hinged to the bottom of the mail car in the doorway thereof and is held in a raised or lowered position by the spring 64, the bridge being constructed as shown in Fig. 9 so that the same spring may be used for holding the bridge in either a raised or a lowered position.

When the mail catcher reaches one end portion of the track 16 it is desired to stop the same and therefore the rails have their end portions elevated as clearly shown in Figs. 1, 3 and 4. There is also provided a bumper which is slidably mounted upon the inclined end portions of the track and is yieldably held in a normal position by the weight 65 carried by the rope 66. This rope or cable 66 passes around the pulleys 67 and is connected with the frame 68 of the bumper and the weights normally hold the bumper at the lower end of the inclined portion of the track. This frame 68 carries longitudinally extending bars 69 and a cross bar 70 from which extends the hook 71 for engaging the latch 41 and releasing it from the tooth 42 when the carriage starts on its return trip. The supporting wheels 72 and 73 of the frame 68 are carried by the axles 74 and 75 and rest upon the tread of the rails 16 while the small guard wheels 76 are rotatably connected with the strip 77 suspended from the axles of the wheels 72 and 73. A secondary bumper is positioned adjacent the end of the track and includes stationary bars 78 and slidable bars 79, the sliding bars 79 being provided with pins 80 which pass through openings formed in the stationary bars 78 and carry springs 81 positioned between the bars 78 and 79. It is of course understood that one set of bars 78 and 79 together with the pin 80 and spring 81 will be connected with each of the rails and that the bars 79 of the two sets may be connected if desired by any suitable means. In order to releasably connect the auxiliary car with the bumper there has been provided clutch levers 82 which are pivotally mounted and yieldably held in the normal position by the spring 83 and weights 84 carried by the cable 85. A hook 86 is provided to engage the frame 68 of the bumper so that after the auxiliary car has been engaged by the clutch levers and the bumper moved up the incline the frame of the bumper may be engaged by the hook 86 and the auxiliary frame held stationary until the hook is moved to a releasing position by means of the line 87.

If desired the auxiliary car may be releasably held at one end of the track by the two bars 88 and 89 which are pivotally connected with the rails and connected to each other by the bar 90. As the auxiliary car moves up the incline the forward end of the car will strike the forward bar 88 thus swinging the same from the position shown in full line to that indicated by dotted lines in Fig. 1 and thereby raising the second bar 89. The body portion 31 of the motor car will then be positioned between the two raised bars and the forward raised bar 88 will be engaged by the hook 91. This hook 91 is yieldably held in a normal position by the spring 92 and therefore the bar 88 will not be permitted to return to its original position until the hook 91 has been moved out of an operative position by means of the line 93. When the auxiliary car reaches one end of the track it is necessary that the trolley pole at one end be moved out of engagement with the trolley wire and therefore the trip 94 has been provided. This trip 94 is rotatably mounted upon the trolley wire and is engaged by a rod 95 the upper end of which is pivotally connected with the rocker lever 96. In Fig. 6 this lever 96 has been shown pivotally connected with the bracing rod 23 for the arch 18 and the actuating cables or lines 97 and 98 have been shown connected with the upper and lower ends of the lever 96 and then lead to a convenient place where the station master can move the lever to raise and lower the trip 94. In the remaining figures the lever 96 is shown pivotally connected with a strip 99 which is supported intermediate its length by the bracing bars 100 and 101 leading from the posts 19 and arch 18 respectively. This strip is additionally supported by the bracing bracket 102 leading from the post and has one end portion connected with the U-shaped bracket 103 which is also carried by the post. The lines 104 and 105 which lead from the lever 96 pass around pulley wheels 106 positioned above and below the bar 99 and are connected with the lever 107. This lever 107 is pivotally connected with the U-shaped bracket 103 and is actuated by wires or lines 108 leading to the station platform or some other place so that they will be within easy reach of the station master.

In the operation of this mail catcher the train approaches the station and the station master will release the auxiliary car thus permitting it to travel down the incline and onto the main stretch of the auxiliary track. When the train reaches the station the bridge mounted upon the mail car will be connected with the receptacle and the mail clerk can then pass the sacks of mail from the mail car into the receptacle and withdraw those placed in the receptacle by the station master. After the mail clerk has transferred the mail the bridge will be raised and the auxiliary car will then travel the remainder of the distance along its track until it reaches the incline at the farthest end. The length of this auxiliary track will be regulated so that the auxiliary car will only have to travel a short distance after the mail has been transferred before reaching the incline. As the car reaches the incline the trip will throw the trolley pole out of engagement with the wire and the latch 41 will be engaged by the tooth 42. The proper lines can then be drawn to release the bumper and the bumper will then travel down the incline with the auxiliary car until the auxiliary car reaches the bottom of the incline. When in this position the weights 84 will engage the pulley over which the cable 85 passes and this will cause the line or cable 85 to be drawn to swing the gripping arms 82 out of engagement with the car thus permitting the car to travel free of the bumper. As the car moves out of engagement with the bumper the hooks 71 will engage the latch 41 and move it out of engagement with the tooth 42 thus permitting the trolley pole to return to its normal position and bring its wheel into engagement with the wire. The car will then travel to the opposite end of the track where it will be brought to a stop. It will thus be seen that this auxiliary car will travel along its track with the mail car while the mail clerk is transferring the mail from one to the other and upon reaching one end can be retained there or may be permitted to return to the opposite end of the track.

This device could also be used in rural free delivery system and the mail for the different people along the route could be placed in the pigeon holes or boxes placed in the larger ones with packages in the same. The car would then be started along the track when the car reached the local post-office or reached the end of the line a trip would move the trolley pole out of engagement with the wire and the mail would then be removed from the boxes. After all of the mail had been removed the car could be returned to the starting point by drawing upon one of the lines 109 thus moving its trigger 110 to throw the latch out of engagement with the retaining tooth. The proper trolley pole would then be raised by its spring until its trolley wheel engaged the wire and the car would return to its starting place. If desired passengers might also be carried in a car similar to that shown in Fig. 12. Of course this car would have to be larger than those used for mail matter only and the passengers would be placed in the compartments 111 and packages and other articles could be placed in the remaining sections of the car. The passengers could then travel along the track and stop the car when they desired by moving the trolley pole out of engagement with the wire. The car would then be started again by returning the trolley pole to its normal position with its wheel in engagement with the wire. It will thus be seen that I have provided an auxiliary car which can be used alongside the main tracks of a railroad so that the mail clerks can easily transfer mail from the mail car to the auxiliary car and take mail sacks from the basket of the auxiliary car and transfer them to the mail car. It will also be seen that this car could be used in connection with rural free delivery system in which the mail for a certain locality would be placed in the pigeon holes and the doors locked and the car then sent along the track until it reached its destination where it would come to a stop and remain there until all of the mail matter had been removed from the pigeon holes and the car then returned to its starting place.

What is claimed is:—

1. In a mail handling apparatus the combination of a main track, an auxiliary track, a source of electric energy, an auxiliary car traveling upon said auxiliary track and including a receptacle, means for releasably holding said auxiliary car at one end of said auxiliary track, power gathering means carried by said auxiliary car, means for releasably holding said power gathering means out of engagement with said source of motive force, means for releasing said power gathering means, and means for releasably connecting said auxiliary car with a mail car traveling along said main track.

2. In a mail handling device a track, a source of electric energy, a car mounted upon said track, means movably connected with said car for gathering electric energy from said source, means for releasably holding said gathering means in an inoperative position, means for releasably holding said car at one end of said track, and means for releasing said gathering means when said car is released from said holding means.

3. In a mail handling device a track having one end portion positioned at an incline, a source of electric energy, bumper means movably mounted upon the incline portion of said track and including means for engaging said car to releasably hold the same at the end of the track, and means carried by said car for gathering electric energy from said source.

4. In a mail handling apparatus a track, a motor car mounted upon said track, a source of electric energy, means carried by said car for gathering electric energy from said source, means carried by the source of electric energy for moving said gathering means to an inoperative position, actuating means for said last mentioned means, means for releasably holding said car at one end of said track, and means for releasing said gathering means to permit the same to move to an operative position.

5. In a mail handling apparatus a track, a source of electric energy, a motor car mounted upon said track and provided with trolley poles for engaging said source of electric energy, a trip carried by said source for moving said trolley poles to an inoperative position, means for moving said trip into and out of an operative position, a bumper mounted upon said track and provided with means for engaging said car, means carried by said bumper for releasing said trolley pole to permit the same to move into engagement with said source.

6. In a mail handling apparatus a track, a source of electric energy, a motor car mounted upon said track, trolley poles carried by said motor car for engaging said source, a trip pivotally connected with said source, a rod connected with said trip, means for moving said rod to raise and lower said trip, means for releasably holding said trolley pole in an inoperative position, and means for releasably holding said car at one end of said track.

7. In a mail handling apparatus a track including rails, supporting means for said rails including posts, a trolley wire carried by said supporting means, a motor car upon said rails, a trolley pole carried by said car, a trip movably connected with said trolley wire, a rocker lever pivotally connected with said supporting means, an actuating rod for said trip connecting the same with said lever and means for moving said lever to move said trip into and out of position for engaging said trolley pole.

8. In a mail handling apparatus a track including rails, standards, arches carried by said standards and connected with said rails, a trolley wire connected with said arches, a trip movably mounted upon said trolley wire, bracing means for one of said arches, a rocker lever pivotally connected with said bracing means, a rod connecting said lever with said trip, means for moving said lever for moving said rod to raise and lower said trip, a motor car mounted upon said rails, and a trolley pole for said motor car engaging said trolley wire and moved to an inoperative position by said trip.

9. In a mail handling apparatus a track including rails, a carriage movably mounted upon said rails, a pulley wheel connected with one of said rails, a weight, a line connected with said weight passing around said pulley wheel and connected with said carriage for yieldably holding the carriage in a normal position for the carriage to constitute bumper means, means for releasably engaging said carriage to releasably hold the same out of its normal position, bumper means for said carriage carried by said rails, a car mounted upon said rails, and clutch means carried by said bumper carriage for engaging said car to releasably hold the same in engagement with said car.

10. In a mail handling apparatus a track including rails, a car mounted upon said rails, bars pivotally connected with one of said rails, means connecting said bars to cause the same to move together, said bars being moved to a raised position by said car engaging the same and said bars engaging said car to hold the same at one end of said track, means for releasably engaging one of said bars to releasably hold the same in a raised position, a source of electric energy, means carried by said car for gathering energy from said source, means for releasably holding said gathering means in an inoperative position, and means for moving said last mentioned means out of engagement with its holding means.

11. In a mail handling apparatus a track including rails, a car traveling along said track, said car including a body portion, a receptacle suspended from said body portion, trucks pivotally connected with said body portion, axles carried by said trucks above and below said rails, wheels mounted upon said axles and engaging the upper and lower faces of said rails, electrically operated driving means, means for transmitting power from said driving means to said axles, a source of electric energy, and means for gathering said energy and conveying the same to said driving means.

12. In a mail handling apparatus a track including rails, a car mounted upon said track, said car including a body portion, trucks carried by said body portion and including plates pivotally connected with said body portion, bearing brackets connected with said plates, axles carried by said bearing brackets, wheels carried by said axles and engaging the upper faces of said rails, bearing brackets carried by said first mentioned bearing brackets, axles carried by said second mentioned bearing brackets, wheels carried by said axles and engaging the lower faces of said rails, resilient means yieldably holding said trucks in a normal position, a driving shaft, means for rotating said driving shaft, means for transmitting rotary motion from said driving shaft to said upper axles.

13. In a mail handling apparatus a track including rails, a car movably mounted upon said rails, a source of electric energy, a motor for said car, means for transmitting electric energy from said source to said motor, means for releasably holding said transmitting means in an inoperative position, means for releasably holding said car at one end of said track, means for releasably holding said last mentioned means in an adjusted position, and means for releasing said transmitting means when said car is released from its holding means.

In testimony whereof I affix my signature in presence of two witnesses.

GEORGE E. KERNS.

Witnesses:
A. F. FLEER,
C. A. CALVERT.

Copies of this patent may be obtained for five cents each, by addressing the "Commissioner of Patents, Washington, D. C."